UNITED STATES PATENT OFFICE.

SUMNER W. GRIFFIN, OF CHELSEA, MASSACHUSETTS.

IMPROVEMENT IN PROCESSES FOR CURING FISH.

Specification forming part of Letters Patent No. 204,966, dated June 18, 1878; application filed May 17, 1878.

*To all whom it may concern:*

Be it known that I, SUMNER W. GRIFFIN, of Chelsea, of the county of Suffolk and State of Massachusetts, have invented a new and useful Improvement in Curing Fish; and do hereby declare the same to be described as follows:

My said invention relates to what, in commerce, is known by the term "salt fish."

Heretofore in the process of salting cod, haddock, hake, or other fish of like character, they have been immersed in strong brine or pickle, or while in a wet state have had common salt applied to them, after which they have been exposed on frames or otherwise to the atmosphere, so as to be dried thereby and rendered fit for the market. In midsummer and certain other seasons of the year, the process of drying fish in such manner cannot be accomplished without great danger of their becoming putrefied or injured by heat. At any rate, such method of drying usually requires a long period of time and much attention in turning the fish and care that they do not become wet by rain or fog.

In carrying out my new or improved process of curing the fish, I first salt them in the manner usually practiced by exposing them to or immersing them in a strong brine or solution of salt; or they may be laid in a tub and salt sprinkled or laid on them, they being allowed to remain until the salt may have become dissolved and sufficiently entered therein. Next the bones and skin should be removed from the flesh, and the latter, if not sufficiently reduced, is to be cut or broken up into small pieces and put into a powerful press and compressed thereby, so as to drive out the surplus pickle and reduce the mass to a dry, or nearly dry, cake or cakes. In this way the process of curing the fish is not only greatly facilitated, or is accomplished more economically and in a comparatively very much shorter time, but there is a considerable saving of pickle or brine by it, which may be utilized in the curing of more of the fish or in other ways. Besides, all danger of decomposition of the fish is avoided. The article thus prepared or deprived of water and surplus salt, and compacted or reduced to a stiff or slightly-yielding cake or cakes, not only differs from fish as usually cured and put up for sale, but is rendered less liable to deliquesce, and can be preserved to better advantage in its normal condition in warm or humid climates.

I am aware of the process described in Letters Patent No. 88,064, which involves as one of its steps or elements a resalting of the fish or steeping it in brine after reducing it to a granulated state, the fish having been previously salted.

In carrying out my process, the fish is neither reduced to a granulated state, nor is it subsequently resalted before being compressed.

What I claim as my invention is—

The improved process of curing fish, such consisting in salting them, removing the bones and skin from the flesh, and subsequently, without granulating it and soaking it in brine, subjecting the said flesh to compression in a press, so as to expel the water or surplus brine from and reduce the mass to a cake or cakes, as set forth.

SUMNER W. GRIFFIN.

Witnesses:
R. H. EDDY,
JOHN R. SNOW.